United States Patent

Gilliéron

[11] Patent Number: 5,925,954
[45] Date of Patent: Jul. 20, 1999

[54] ELECTRIC DRIVE

[75] Inventor: Christian Gilliéron, Murten, Switzerland

[73] Assignee: Saia-Burgess Electronics AG, Murten, Switzerland

[21] Appl. No.: 08/944,834

[22] Filed: Oct. 6, 1997

Related U.S. Application Data

[30] Foreign Application Priority Data

Nov. 6, 1996 [CH] Switzerland ............................ 2737/96

[51] Int. Cl.⁶ .............................. H02K 5/00; H02K 5/24; F16M 1/00
[52] U.S. Cl. ................................ 310/89; 310/91; 310/51; 248/672
[58] Field of Search ................................... 310/43, 45, 51, 310/89, 91; 248/552, 559, 560, 564, 633, 634, 635, 638, 672

[56] References Cited

U.S. PATENT DOCUMENTS

| | | | |
|---|---|---|---|
| 3,870,908 | 3/1975 | Button et al. ............................ | 310/91 |
| 4,742,256 | 5/1988 | Tanaka ...................................... | 310/51 |
| 4,904,908 | 2/1990 | Buschur .................................. | 318/282 |
| 4,931,683 | 6/1990 | Gleixner et al. .......................... | 310/89 |
| 5,102,090 | 4/1992 | Farris et al. ............................. | 248/674 |
| 5,108,077 | 4/1992 | Spaltofski ............................... | 248/638 |
| 5,170,984 | 12/1992 | Ruckwardt .............................. | 248/638 |
| 5,482,444 | 1/1996 | Coha et al. .............................. | 248/638 |

FOREIGN PATENT DOCUMENTS

| | | |
|---|---|---|
| 38 37 758 | 5/1989 | Germany . |
| 20 60 816 | 5/1981 | United Kingdom . |

*Primary Examiner*—Clayton LaBalle
*Attorney, Agent, or Firm*—Foley & Lardner

[57] ABSTRACT

An electric drive has a cabinet with fixation points from which each includes a resilient web construction made of a first synthetic material which is partially surrounded by a second synthetic material in order to absorb vibrations. Thus in choosing adequate elasticity of the synthetic materials the electric drive can safely be secured by means of its fixation points thereby avoiding undesired resonance.

11 Claims, 3 Drawing Sheets

ELECTRIC DRIVE

BACKGROUND OF THE INVENTION

The present invention relates to an electric drive according to the preamble of claim 1. Such electric drives generally include a motor part and a gear part and are, e.g., used in the car industry, for air conditioning appliances, door lockers, door windows and so forth.

Such electric drives must, on the one hand, have sufficient stiffness to be fixed in a safe manner, and on the other hand possible resonance frequencies should be absorbed to avoid noise and deterioration.

It is an object of the present invention to create such an electric drive which can be safely fixed and which avoids resonance.

SUMMARY OF THE INVENTION

According to the invention this object is achieved by an electric drive following to claim 1. The design of the resilient web construction and the choice of the elasticity of the synthetic materials used allow a sufficiently safe fixation without undesired resonance at the fixation points.

Further advantageous embodiments are described in the dependent claims.

In the following an embodiment of the electric drive according to the invention will be described as a non-limiting example in more detail by means of the drawings.

DETAILED DESCRIPTION OF THE INVENTION

Figure 1:
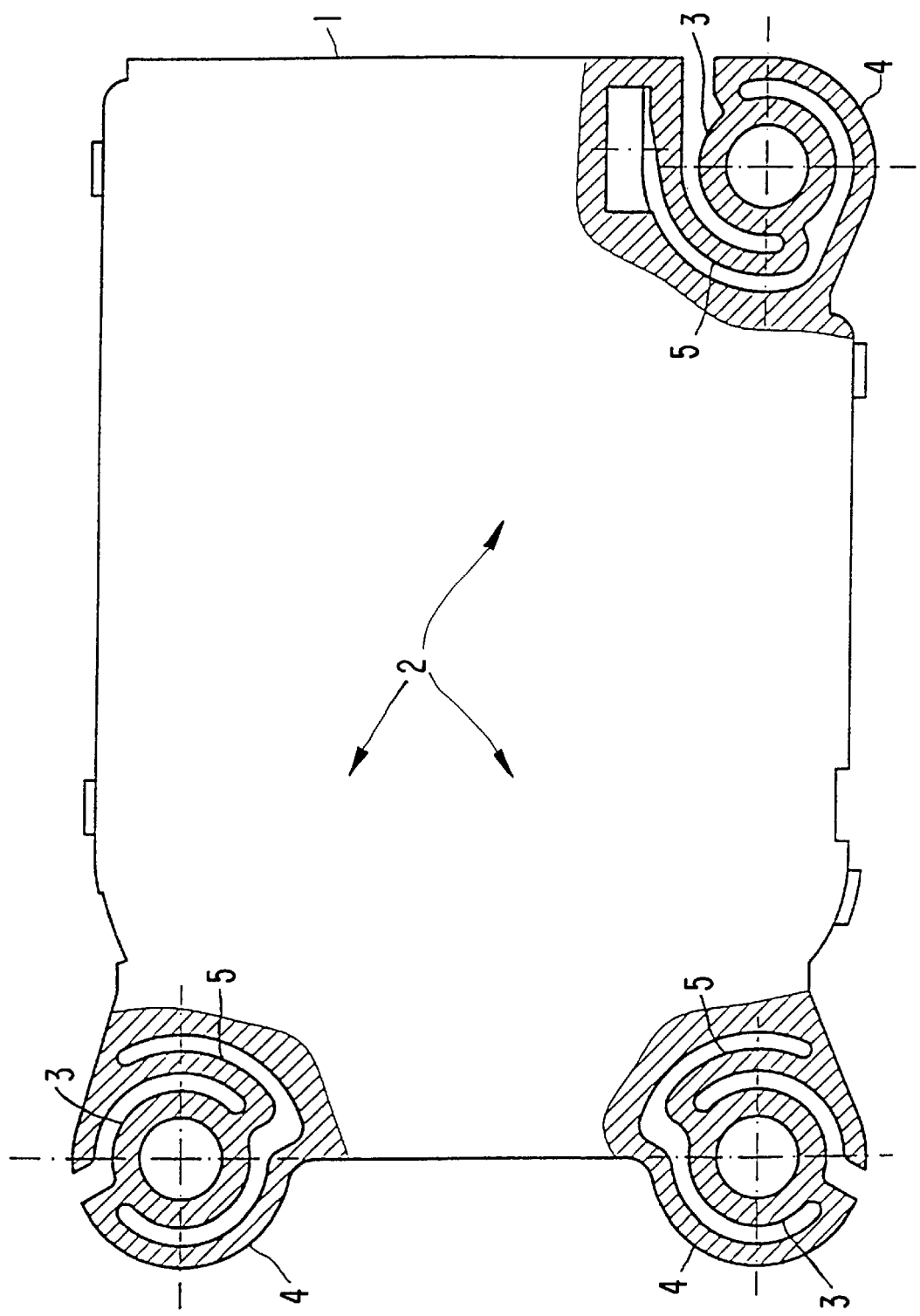
FIG. 1 shows schematically a top view of a part of a cabinet made from a first type of synthetic material.

In FIG. 1 is shown a schematically top view on a cabinet part made of a first synthetic material, at approximately six times its natural size. This cabinet part e.g. forms a separation wall between a motor part and a gear part of the electric drive, as will be described in the following by means of FIG. 3. This cabinet part has basically the shape of a panel and is provided with some not shown openings which are irrelevant with respect to the invention. The panel shaped part 1 comprises three fixation points 2 for the electric drive. Of course, there may be used an other number of fixation points, e.g. four fixation points. These fixation points 2 may also be disposed on other parts of the cabinet of the electric drive.

The cabinet part shown in FIG. 1 is not fully completed. In a first step the cabinet part according to FIG. 1 is injection-molded in a first synthetic material, e.g. an adhesion modified polyamid. Each fixation point 2 includes a resilient web construction comprising an annular central crosspiece 3 which by means of two approximately diametrically mounted connecting crosspieces 4, 5 is resiliently attached to the cabinet part. The connecting crosspieces 4, 5 are e.g. shaped as circular ring sectors.

The central crosspiece 3 and therewith the electric drive can be fixed by means of screws to its surrounding.

Figure 2:
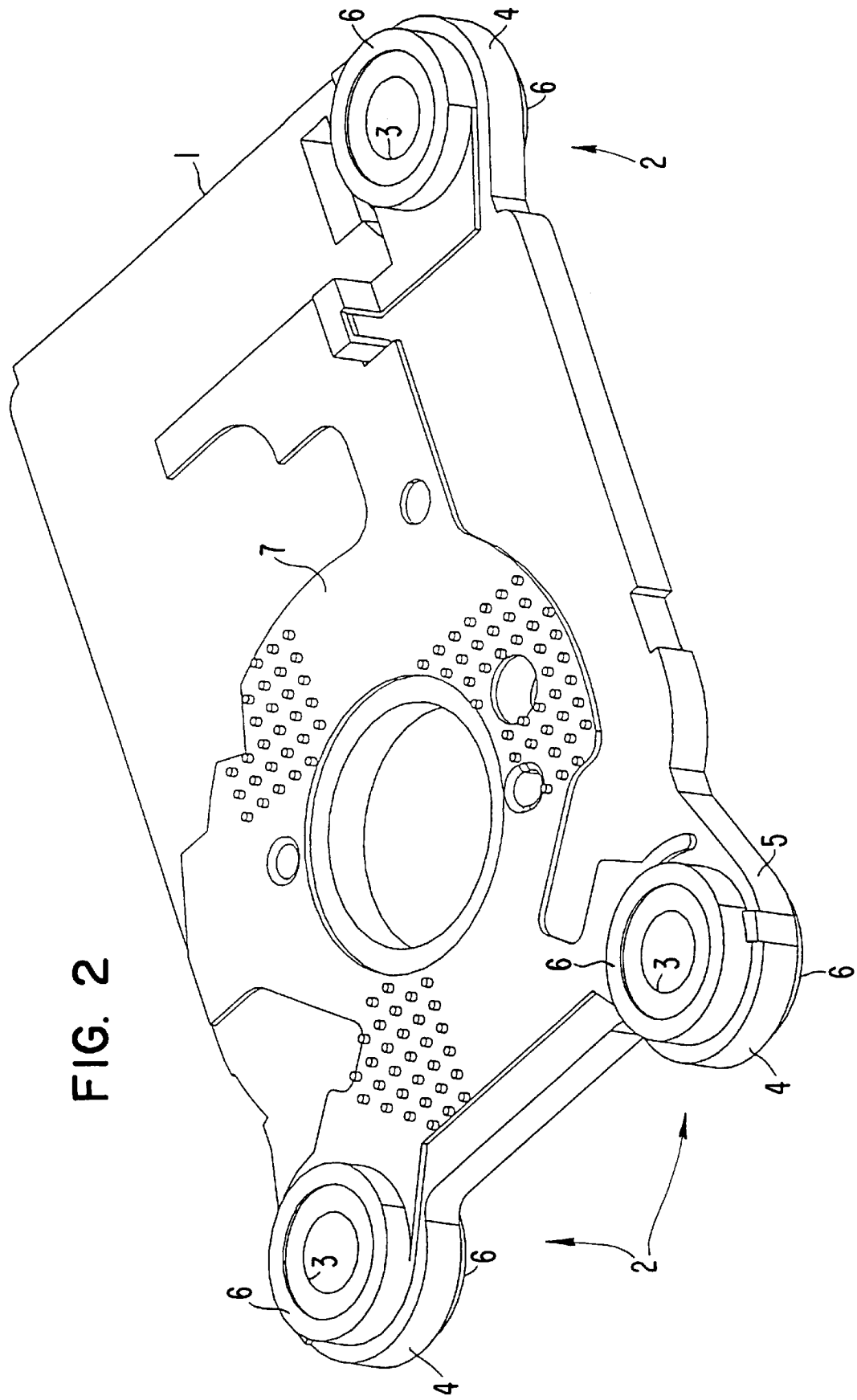
FIG. 2 is a perspective view of the cabinet part of FIG. 1 after adjunction of the second synthetic material.

In a second injection-molding process a second synthetic material is applied. FIG. 2 shows in perspective view the cabinet part of FIG. 1 after the second synthetic material has been added. The resilient web construction is partly surrounded by the second synthetic material, to increase its spring stiffness and therewith its ability to of absorb of vibrations. The second synthetic material, which is softer than the first one, can e.g. be a thermoplastic elastomer. The fixation points 2 are thus produced in a two component injection-molding process.

The second synthetic material is injected in-between the central crosspiece 3 and the connecting crosspieces 4, 5, and in-between the connecting crosspiece 5 and the panel shaped part 1 of the cabinet part. The connecting parts between the central crosspiece 3 and the connecting crosspieces 4, 5 are surrounded by the second synthetic material in such a way that an essentially cylindrical absorber 6 is formed which surrounds the central crosspiece 3, and protrudes above and beneath. In the second injection-molding step further necessary parts, as e.g. a rubber mat 7, can be produced in the second synthetic material. The fact that the web construction 3, 4, 5 is rendered stiffer by being surrounded by the second synthetic material influences the elasticity of the fixation points 2.

The central crosspiece 3 acts as contact surface of the fixation points 2 relative to the element onto which the electric drive is to be mounted. The absorber 6, made from the softer synthetic material, remains unrestrained on its top and bottom sides and does hence not form a contact surface of the fixation points 2. After having mounted the electric drive by means of screws it is resiliently attached by the web construction 3, 4, 5 made of the first synthetic material, which is surrounded by the second synthetic material and therefore is stiffened.

The thickness and length of the crosspieces of the springy web construction 3, 4, 5 as well as the elasticity of the two synthetic materials used are to be chosen in such a way that the resonance frequencies of the fixation points 2 lie outside of a given frequency range in which resonance is not desired. The expert knows how to determine the corresponding parameters, possibly by trial and error. Thus it is e.g. advantageous to use a synthetic material as second synthetic material which has a Shore-A-hardness of in-between 30 and 60.

Figure 3:
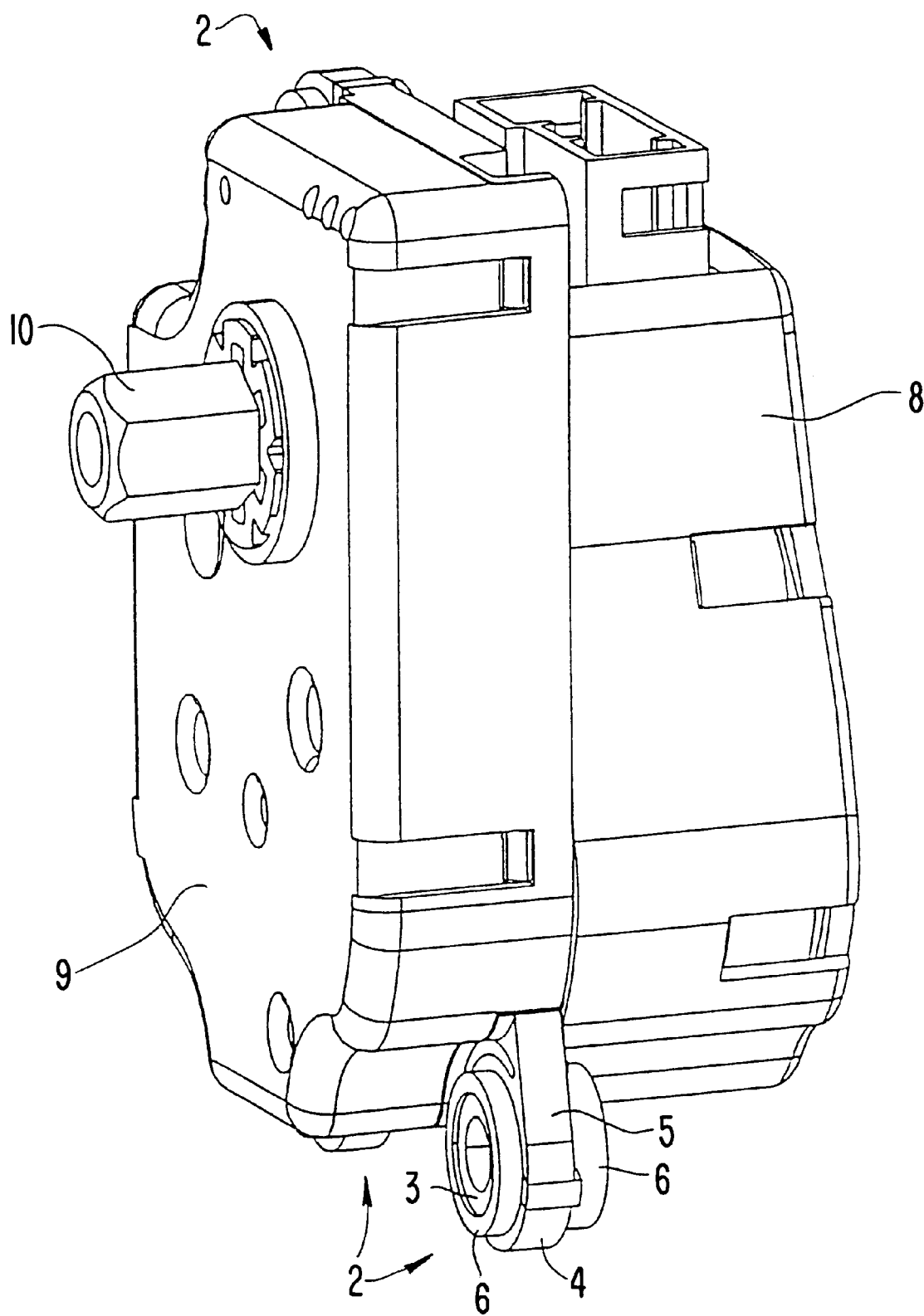
FIG. 3 is a perspective view of the electric drive.

In FIG. 3 a perspective view of the electric drive is shown. Its cabinet includes a motor casing 8 comprising the motor and a gear casing 9 comprising the gear. A shaft 10 which can be driven by the motor penetrates through the gear casing 9. The fixation points 2, three in number for the embodiment shown, allow an attachment which is substantially free of resonance in a defined frequency range.

I claim:

1. An electric drive with a support part comprising at least one fixation point, wherein the fixation point comprises a resilient web structure made of a first synthetic material, which web structure is integral to the support part and is partially surrounded by a second synthetic material for absorbing vibrations.

2. An electric drive according to claim 1, wherein the first and second synthetic materials are suitable for building the at least one fixation point by a two-component injection-molding process.

3. An electric drive according to claim 1, wherein the resilient web structure comprises a central crosspiece which is resiliently connected to the support part by connecting crosspieces which are connected to points of the central crosspiece,the points being located on opposite sides of the central crosspiece.

4. An electric drive according to claim 3, wherein the central crosspiece has an annular shape and the connecting crosspieces are connected to diametrically opposite points of the central crosspiece.

5. An electric drive according to claim 3, wherein the connecting crosspieces have substantially the shape of circular ring sectors.

6. An electric drive according to claim 3, wherein the central crosspiece forms a contact surface of the fixation point.

7. An electric drive according to claim 3, wherein the dimensions of the central crosspiece and connecting crosspieces of the resilient web structure and the elasticity of the first and second synthetic materials used are chosen in such a way that the resonance frequency of each fixation point lies substantially outside of a defined frequency range.

8. An electric drive according to claim 1, wherein the support part includes three or four fixation points.

9. An electric drive according to claim 1, wherein one of the first and second synthetic materials is harder than the other.

10. An electric drive according to claim 9, wherein the harder of the two synthetic materials is an adhesion modified polymer.

11. An electric drive according to claim 9, wherein the softer of the two synthetic materials is a thermoplastic elastomer.

* * * * *